C. DARGENT.
COUPLING FOR FLOATS.
APPLICATION FILED JULY 10, 1906.
939,397.
Patented Nov. 9, 1909.
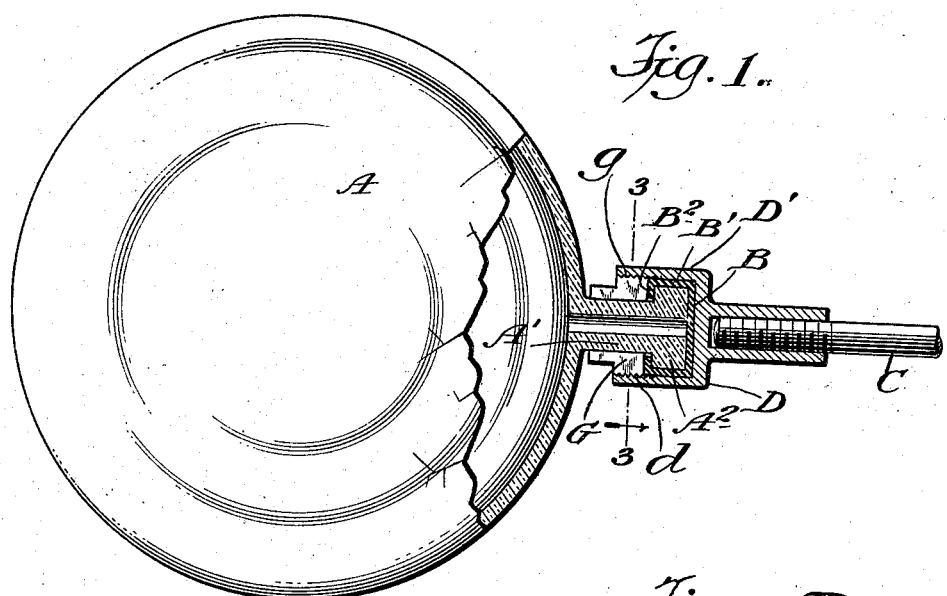
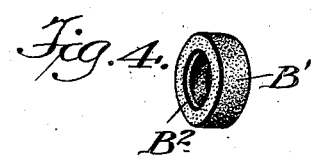
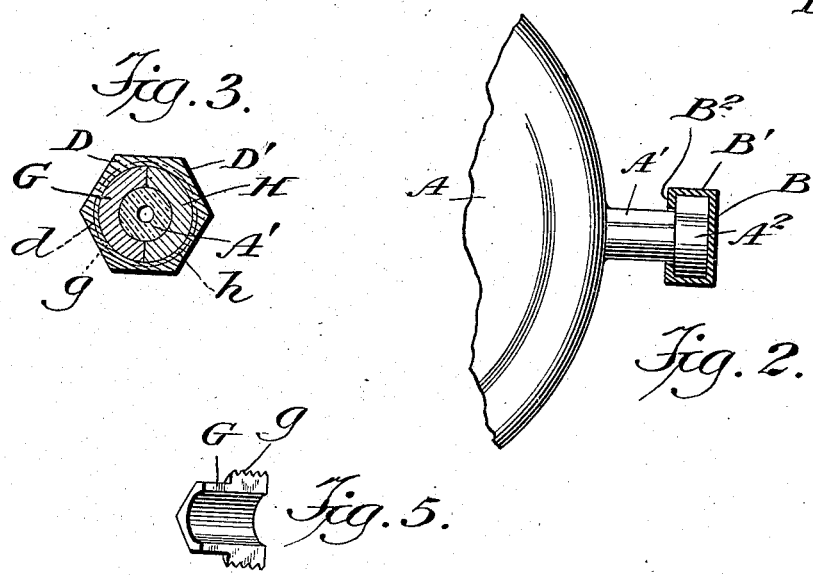
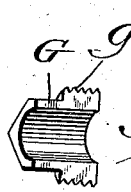
Witnesses
A. R. Appleman
Alphonse Major
Inventor
Charles Dargent
By his Attorney
Thomas Drew Stetson

UNITED STATES PATENT OFFICE.

CHARLES DARGENT, OF NEW YORK, N. Y.

COUPLING FOR FLOATS.

939,397.

Specification of Letters Patent.   Patented Nov. 9, 1909.

Application filed July 10, 1906.   Serial No. 325,435.

*To all whom it may concern:*

Be it known that I, CHARLES DARGENT, a citizen of the United States, residing in the borough of Brooklyn, in the city and State of New York, have invented a new and useful Improvement in Couplings for Floats, of which the following is a specification.

The invention is capable of use in various sizes and adapted for many purposes. I will describe it as used on the necks of the glass floats now a favorite in the plumbing trade in connecting such float with the lever by which it acts to admit the water or to shut it off according as the water rises or sinks in the tank. I will assume that the tank is small and the float is small, such as are used in connection with water closets to maintain a supply for flushing.

I have devised a form and arrangement of a soft rubber piece which may be termed a cap, a diaphragm, or a washer and of the parts used therewith, which is simple, easily applied and exchanged and gives unusual facilities for removal whenever required to pour out water or for other purpose and for rapidly making a tight joint and a strong and rigid connection with the lever.

The following is a description of what I consider the best means of carrying out the invention.

The accompanying drawings form a part of this specification.

Figure 1 is a side elevation partly in vertical section showing all the parts combined.
Fig. 2 is a corresponding view with only the float and the rubber packing before the other parts are applied. Fig. 3 is a cross section on the line 3—3 in Fig. 1 seen from the left. Fig. 4 is a perspective view of the rubber part detached and Fig. 5 is a perspective view of another part detached.

Similar letters and marks of reference indicate corresponding parts in all the figures where they appear.

A is the main body and A' and A² are the stem or neck of the float, A' being the smooth tubular portion and A² being a flange on the outer end of A'. All these parts are in a single piece.

B is a disk of rubber. B' is a rim thereon and B² an internal flange on the edge of such rim. All these parts B B' and B² are molded or otherwise produced in a single piece. The material is good soft vulcanized india-rubber. It is easily stretched enough to allow it to be applied on the neck of the float in the relation shown in Figs. 1 and 2 and to be removed therefrom when required.

C is the lever connected as usual to the mechanism not shown which regulates the induction of water into the tank in which the float is supported. Its outer end which engages the connection to the float is screw-threaded.

D is a coupling cap which performs important functions. Its outer end of relatively small diameter has a screw-threaded hole which engages the lever C. These parts may be engaged together permanently. The other end of D is of relatively large diameter with its interior screw-threaded as indicated by $d$ and its exterior D' made hexagonal to aid in holding it against being turned when subjected to a turning strain.

G and H are counterpart pieces each carrying screw-threads $g$ and $h$ which match together to form a continuous screw adapted to engage in the internal screw threads $d$. These screw-threads $g$ and $h$ extend each only about half the length of the piece G or H the remainder of the length being made hexagonal on its exterior. The interior of the pieces G and H constitutes a smooth cylindrical hole fitting easily on the smooth exterior of the neck A'.

To assemble the parts, the rubber piece B B' B² is wrapped over the enlargement on flange A² and the pieces or cheeks G and H are placed loosely in position one on each side of the neck A' and lightly held there by the thumb and finger or otherwise, and the coupling cap D is brought into position, thrust endwise over the rubber D' and engaged with the screw-threads on the cheek-pieces G and H. After it has been screwed on as far as it will go easily the tightening of the union is effected by using two wrenches not shown one applying in the obvious manner on the hexagonal exterior D' to hold it at rest and the other, a smaller wrench, applied intermittently on the hexagonal exterior of G and H turning both as if the two were a single screw. The engagement of the threads $g$ and $h$ within the threads $d$ induces a tight grip and forms a water-tight joint around two complete circles,—one the bearing of the inner face of the disk D against the rubber B and the other the bearing of the outer end of each cheek G and H against the rubber B². The engagement of the lever C with the outer end of D may be effected after, but it is better to make it before, because its very firm union may be better promoted by screwing together with great force before the more delicate parts are attached.

I attach importance to the fact that the rod C is in line with the neck and is engaged by screw threads for the reason among others that it provides for rigidly uniting and easily detaching the parts.

Modifications may be made without departing from the principle or sacrificing the advantages of the invention. The screw-threaded hole in the coupling D which receives the lever C may be extended quite through. The parts C and D may be made in one piece.

Other material than glass may be used for the body neck and flange of the float and other means than the hexagonal shapes for applying wrenches may be employed for holding and turning the coupling cap and the cheeks or two-part screw-threaded holding and releasing means D, G, and H.

I claim as my invention:—

1. The combination with a float formed with a neck and a flange, of a packing embracing said flange and extending over the edge of same, screw threaded members embracing the neck of the float, and a cap fitting over the packing, flange and neck, and secured to said screw threaded members.

2. The combination with a float body provided with an extension having an annular flange, of a packing embracing said flange, externally screw threaded members embracing said extension, a valve operating rod, and a cap provided with oppositely extending screw threaded recesses, one recess embracing said rod and the other recess embracing said packing and flange, and removably securing said packing in position by means of engagement with said screw threaded members.

Signed at New York city in the county of New York and State of New York this ninth day of July A. D. 1906.

CHARLES DARGENT.

Witnesses:
  THOMAS DREW STETSON,
  N. B. KING.